No. 682,129.
W. A. WALSH.
CORK EXTRACTOR.
(Application filed Feb. 14, 1901.)
Patented Sept. 3, 1901.
(No Model.)
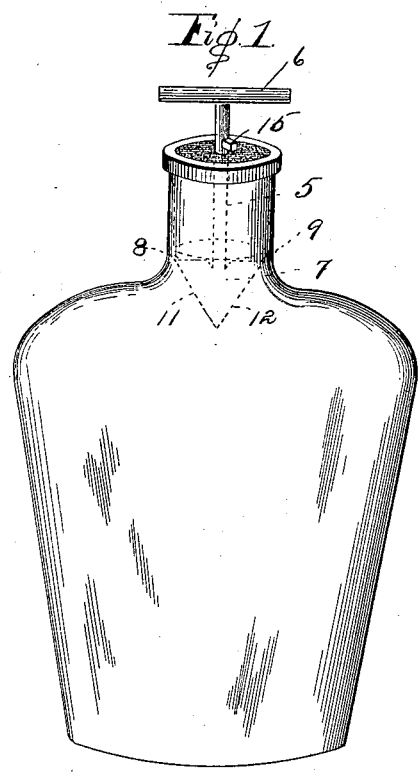
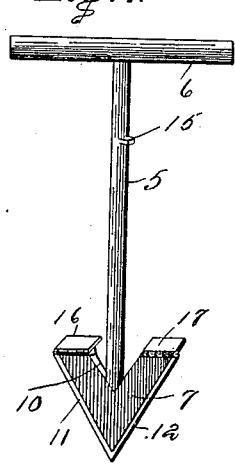
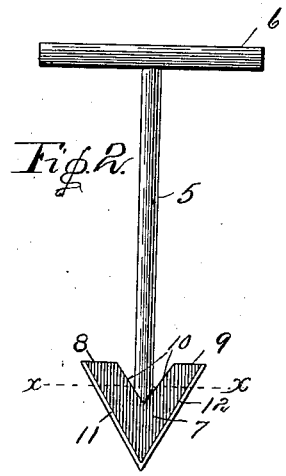
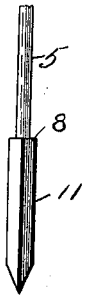
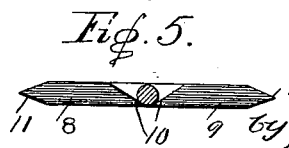
Witnesses
E. A. Ryan.
N. E. Chandlee
Inventor
W. A. Walsh,
by Chandlee Chandlee
Attorney
THE NORRIS PETERS CO., PHOTO-LITHO., WASHINGTON, D. C.

UNITED STATES PATENT OFFICE.

WILLIAM A. WALSH, OF FREDERICTON, CANADA, ASSIGNOR TO FRED. F. DOW, JOHN KILBURN, JOHN McCONNELL, JOHN PALMER, AND ALBERT J. GREGORY, OF SAME PLACE.

CORK-EXTRACTOR.

SPECIFICATION forming part of Letters Patent No. 682,129, dated September 3, 1901.

Application filed February 14, 1901. Serial No. 47,273. (No model.)

*To all whom it may concern:*

Be it known that I, WILLIAM A. WALSH, a subject of the Queen of England, residing at Fredericton, in the county of York, Province of New Brunswick, Canada, have invented certain new and useful Improvements in Cork-Extractors; and I do hereby declare the following to be a full, clear, and exact description of the invention, such as will enable others skilled in the art to which it appertains to make and use the same.

This invention relates to cork-extractors; and it has for its object to provide a device of this nature which may be used for removing the wires which sometimes hold the corks in place, and which, furthermore, may be passed through a cork and then turned and engaged therewith in such manner before drawing as will insure the entire cork being removed without any portion thereof falling into the body of the bottle.

Further objects and advantages of the invention will be evident from the following description.

In the drawings forming a portion of this specification, and in which like numerals of reference indicate similar parts in the several views, Figure 1 is a perspective view showing the application of the extractor ready for drawing a cork, a portion of the extractor being indicated in dotted lines. Fig. 2 is a side elevation of the extractor removed from the bottle. Fig. 3 is an edge view of the blade of the extractor with an adjacent portion of the stem. Fig. 4 is a perspective view showing a modification. Fig. 5 is a section on line $x\ x$ of Fig. 2.

Referring now to the drawings, the extractor consists of a stem portion 5, having a handle 6 at one end, said handle lying at right angles to the stem and projecting at both sides thereof. At the opposite end of the stem from the handle 6 is a barbed triangular head 7, the ends of the barbs 8 and 9 being flat and lying in a common plane at right angles to the stem for a purpose to be presently explained and the inner edges of the barbs being beveled to form cutting edges 10. The side edges 11 and 12 of the head are also beveled to form cutting edges, the bevels of the side edges 11 and 12 being double, while the bevels of the inner edges are single, as shown in Fig. 5 of the drawings. In the use of this invention if the cork be fastened with wires a barb of the head is engaged under a wire and the implement is then manipulated to cut the wire on the beveled inner edge of the barb. After the wire has been cut and removed the point of the head is placed centrally of the outer end of the cork and the tool is pressed downwardly to force the head entirely through the cork, the beveled cutting edges of the head permitting of this action, after which the implement is rotated to move the head from alinement with the incision through the cork and the implement is raised to engage the upper flattened ends of the barbs against the lower end of the cork. Further upward movement of the implement effects a withdrawal of the cork, the flattened ends of the barbs preventing the barbs from cutting into the cork. Projecting laterally from the stem 5 of the implement and spaced downwardly from the handle thereof is a lug 15, which lug is adapted for engagement with the cork to prevent the implement from passing downwardly to such an extent as to permit of pinching the fingers of the operator between the handle and the upper end of the neck of the bottle.

In Fig. 4 of the drawings there is shown a modification of the invention wherein wings 16 and 17 are provided and are hinged to the upper ends of the barbs of the head, these wings being adapted to lie in the plane of the head during the passage of the head through the cork and to drop over to lie against the under side of the cork and at right angles to the head after the head has passed through the cork to insure against the head cutting through the cork when the head is drawn upwardly.

In practice other modifications of the invention may be made and any suitable materials and proportions may be used without departing from the spirit of the invention.

What is claimed is—

1. A cork-extractor comprising a stem having a handle, and a tapered head having side cutting edges and provided with upwardly-extending barbs, the inner edges of the barbs forming cutting edges and the upper ends of the barbs being flat and lying in a common plane at right angles to the stem.

2. A cork-extractor comprising a stem having a handle at one end, a lug spaced downwardly from the handle and extending at right angles from the stem, and a head at the opposite end of the stem, said head being triangular and having its downwardly-converging side edges sharpened to form cutting edges, said head having upwardly-extending barbs the inner edges of which are beveled to form cutting edges and the upper ends of which are flattened and lie at right angles to the stem.

3. A cork-extractor comprising a stem provided with a handle and with a triangular head disposed with its side edges converging downwardly and sharpened to form cutting edges, said head having wings hinged to the upper edge thereof at both sides of the stem and adapted for movement to lie in the plane of the head or at right angles thereto.

In testimony whereof I hereunto sign my name, in the presence of two subscribing witnesses, on the 9th day of January, 1901.

WILLIAM A. WALSH.

Witnesses:
N. DOUGHERTY,
W. FARRELL.